Aug. 23, 1966  W. N. LOCKE ETAL  3,267,591
AUDIO TEACHING AID

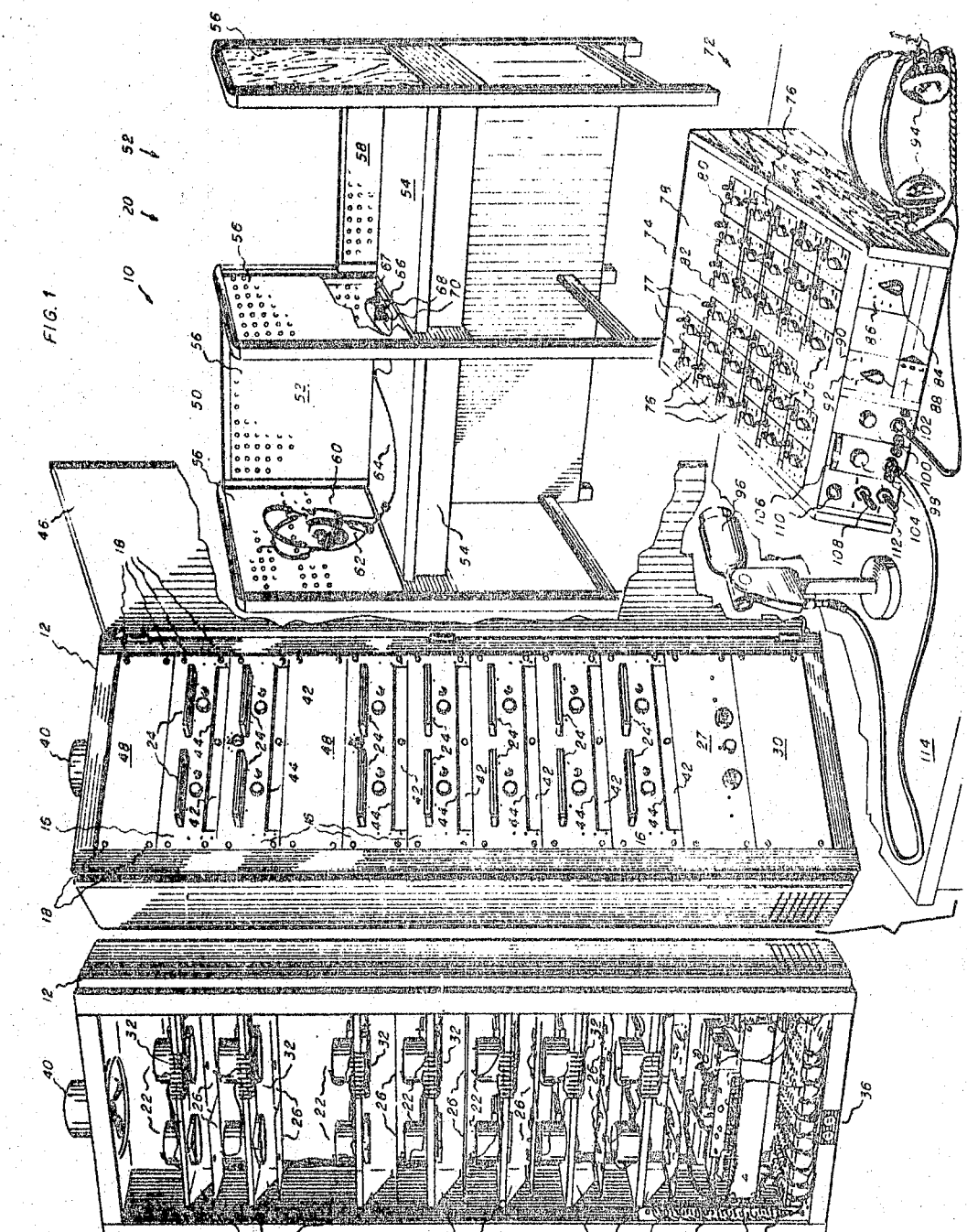

Original Filed July 14, 1960  6 Sheets-Sheet 4

INVENTORS.
WILLIAM N. LOCKE
LEWIS S. BILLIG
ARTHUR BISBERG
BY
ATTORNEY

3,267,591
AUDIO TEACHING AID
William N. Locke, Newtonville, Lewis S. Billig, Wayland, and Arthur Bisberg, Lexington, Mass., assignors to General Electronic Laboratories, Inc., Cambridge, Mass., a corporation of Delaware
Continuation of application Ser. No. 42,822, July 14, 1960. This application Aug. 25, 1964, Ser. No. 397,061
8 Claims. (Cl. 35—35)

This is a continuation of application Serial No. 42,822, filed July 14, 1960, now abandoned.

This invention relates to audio teaching aids and more particularly to multiple student position audio teaching systems electrically controlled from a master teaching station.

The present invention is highly desirable wherever sound is useful as a teaching medium. It is particularly valuable in the teaching of languages, music, and other environmental sounds, etc. It has been found to greatly increase the rate of student learning over that of conventional classroom teaching and succeeds in making all students participate in a classroom lesson as distinguished from single student recitation which has been heretofore customary. It also permits the more gifted students to advance in lessons at a rate commensurate with their ability without being held back by slower students in the class. One aspect of the invention is, that it is particularly valuable in small schools where limited numbers of students make it economically unfeasible to create separate classes for the brighter students. The present invention also makes possible more effective utilization of teacher time in that it turns over to mechanical means repetitive lesson aspects of teaching. It also makes possible the advantages of classroom teaching by our most outstanding teachers, even to small remotely situated schools.

A primary object of the present invention is the provision of a multi-student position audio teaching aid system controlled from a single teaching station.

Another object is the provision of a multi-student position audio teaching aid system wherein a selection of teaching lessons for selected ones of the student position may be made from a single teaching position.

A further object is the provision of a multi-student position audio teaching aid system wherein a single master teacher station is capable of applying any one of a plurality of teaching lessons simultaneously to any one or more student positions and any combination of the lessons to any combination of student positions.

Another object is the provision of a multi-station teaching aid system wherein the major portion of equipment is separate and remote from the teacher and student positions.

A further object is the provision of a multi-station teaching aid system wherein the teacher and student positions are substantially free of electronic equipment other than switches, microphone and head phones.

And a further object is the provision of a multi-student position audio teaching aid system wherein the teacher at a single master control station may not only select for any one or more of the students any one of a plurality of teaching lessons, but may also carry on a conversation with any one of the selected students or speak to all of the students at the same time whether or not a selected teaching lesson is actually appearing at the student position.

And a still further object is the provision of a multi-student position audio teaching aid system wherein each of the students individually records the teaching lesson reaching his position together with his responses to such lesson for subsequent monitoring and comparision.

And another object is the provision of a multi-student audio teaching system of sectionalized construction with each of the sections confined to separate functions for simplifying servicing thereof to the mere operation of unplugging the faulty section and plugging in a properly operating replacement.

These and other objects, features and advantages, will become more apparent from the following description taken in connection with the accompanying drawings of a preferred embodiment of the invention and wherein:

FIG. 1 is an isometric view of a multi-student position audio teaching aid apparatus made in accordance with the present invention with illustrative student booths for two of the student positions;

FIG. 2 is a schematic diagram of the equipment cabinet to more clearly show placement and construction of the apparatus therein;

Figure 3A:
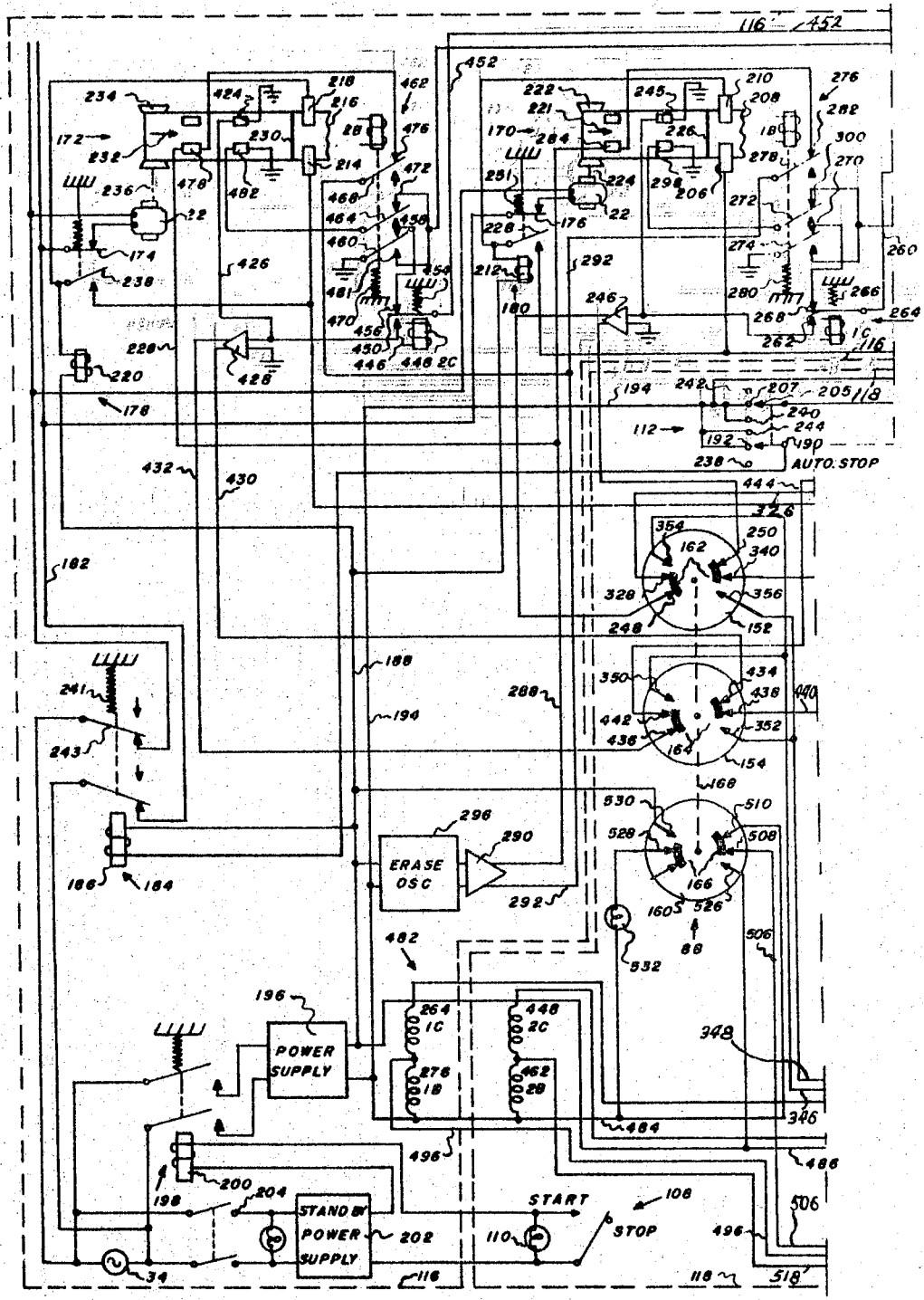
FIGS. 3A and 3B are complementary schematic diagrams which when taken together schematically show the electrical system in the audio teaching aid illustrated in FIG. 1.

Referring to FIG. 1 in more detail, the audio teaching aid system is designated generally by the numeral 10. The audio teaching aid system 10 includes an equipment cabinet 12 carrying a plurality of racks 14, each fixed to a panel 16 and held in place on the cabinet 12 by screws 18. Each of the racks 14 carries the recording and playback equipment accommodating two student positions such as the student positions 20. This equipment at each rack includes a pair of tape recorder and playback drive motors 22, cartridge type tape decks 24 which are insertable through slots in the panel 16, and plug-in type, transistorized amplifiers 26. One of the panels 27 carries both conventional standby and regular power supplies 28 with the bottom panel 30 being a master terminal rack which, with the terminal strips 32 facilitate the overall electrical wiring described in connection with FIGS. 3A and 3B. Electrical power connection to a suitable power source 34 (FIG. 3A) such as a 110-volt alternating current power source may be had through plug-in receptacles 36. A fan 40 at the top of the cabinet 12 is provided for supplying circulation and convection cooling to the electrical components in the cabinet. Swinging hinged doors 42 pivotally mounted to swing on hinges 44 provide an arrangement at the front side of each of the panels 16 for reaching each of the amplifiers 26 for removal and replacement from the front side of the cabinet 12 to facilitate servicing.

Thus, both the tape decks 24 and the amplifiers 26 may be thereby conveniently reached for removal and replacement in rapid and simple manner for any of the student positions directly from the front of the cabinet 12 without the need for moving the cabinet from an obstructing wall. In some instances, however, it may be desirable to eliminate door 42 and make amplifiers 26 accessible only from the back side of the cabinet 12. A pivotally mounted door 46 at the front of the cabinet 12 may be swung closed to hide panels 16 and tape decks 24 from view.

The mounting of all of the basic recording and playback equipment along with power supplies, in a special cabinet 12 has many advantages. For example, in the present instance, the one cabinet 12 accommodates fourteen student positions such as the student positions 20 with the equipment conveniently in one easily accessible location where it may be under complete control of the teacher for policing, and where the mechanical equipment, such as motors and other high voltage apparatus are out of reach of prying student hands, so as to provide a safe as well as convenient arrangement. It also provides versatility in numbers of students which may thereby be accommodated; as for example, while the present cabinet 12, as shown, accommodates fourteen students, an additional four students, making a total of 18 could be accommodated from a single cabinet 12 by replacing the two blank panels 48 with rack-type panels 16. The single cabinet 12 with all of the equipment therein minimizes the amount of valuable classroom space required for storing this equipment, and succeeds in leaving a student free from wasting valuable learning time and distraction entailed in mechanical manipulations thereby permitting him to devote a maximum time and concentration to the all-important function of learning the language.

Figure 3:
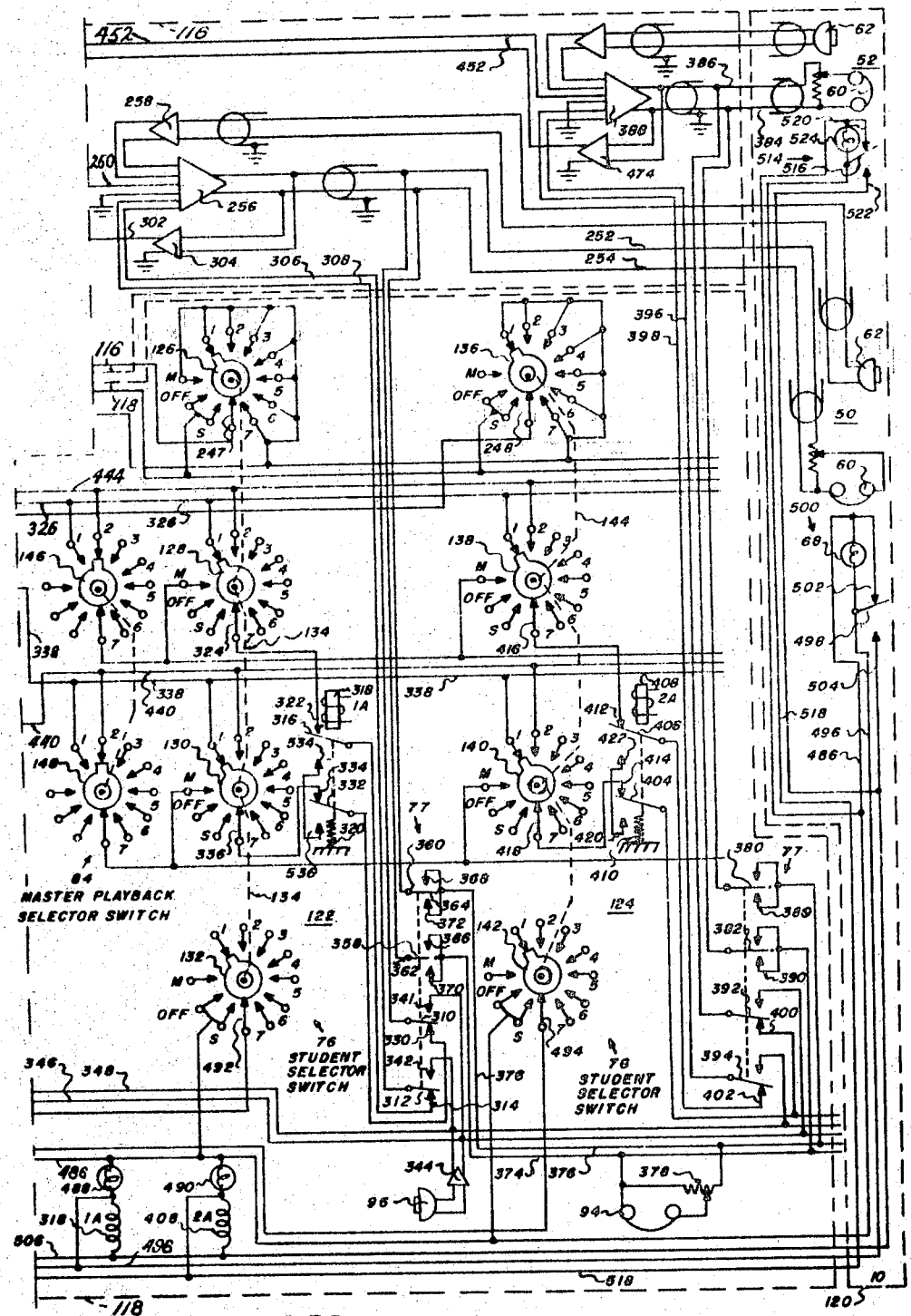

The student positions such as the two student positions 20 are comprised of single student positions 50 and 52 as shown in FIGS. 1 and 3. Each has a desk 54 with side and front panels 56 and 58, preferably of perforated sound-absorbent type panels, to provide a high-degree of privacy for each of the students with effective isolation from adjoining students. The front panel 58 is preferably slideably mounted for retraction downwardly as shown at the student position 52 to thereby remove obstruction to view of the student to the front of the classroom where a motion picture screen, a television screen, or the teacher (not shown) may be visible for supplementing the lesson as will be hereinafter further described.

A pair of earphones 60 having directly mounted thereto a microphone 62 in manner such that it will be in proper position to receive the spoken word of the student when the earphones are in place on his head are supplied for each of the student positions 20. The earphones 60 and microphone 62 are coupled through electric cables 64 to an electrical receptacle 66 also carrying an electric lamp 68 and a selective playback record switch 70 coupled into the system for operation as will be hereinafter further described.

The audio teaching aid system 10 also includes a master or teacher position 72 which includes a control console 74 carrying a plurality of student selector switches 76, one for each student. In the present instance 31 student selector switches 76 are shown with sufficient vacant room on the console 74 for a substantial additional number of student selector switches, if desired, thus indicating the tremendous potential of this system for handling large numbers of students. Each student selector switch 76 has a plurality of stations 78 whereby to select teaching lessons from master tapes in the tape decks 24 in the cabinet 12 as will be further described. By rotating the selector arm 80 to a selected station 78, a selected lesson for the student position corresponding to the particular student selector switch 80 (in this instance assumed for purposes of illustration to be student position 50) is thereby coupled to the tape recorded lesson in the selected tape deck 24. The student then need only move his switch 70 into the record position and he will simultaneously record as well as receive the lesson through his earphones 60 at any desired volume, determined by the setting on his volume control knob 67. By placing all of the student selector switch arms 80 on to the corresponding station 78, all of the student positions 20 may be coupled to the same student lesson.

Alternatively, however, students separately or in any desired number by appropriate adjustment of the student selector switch arms 80 may be tuned to different ones of the tape decks 24 and thereby different lessons so that some of the students in a class may be listening in on one type of lesson, while other students are listening in on different lessons. The versatility of such an arrangement becomes apparent in that it permits the more rapid students to progress more rapidly to more advanced lessons without being impeded by the average and slower students who simultaneously may be on the regular classroom lesson. This is particularly valuable in language teaching where there is a wide difference in student capabilities and facilities for learning the language. It is also important in maximum utilization of classroom space in that several languages may be taught simultaneously in the same classroom.

Where a classroom of a defined size is studying a particular language, switching of the individual students to the desired tape deck 24 is simplified in the present invention, in that one of the stations 78, namely the station 82, on each of the student selector switches 76, is coupled to a common channel as will be described in connection with FIGS. 3A and 3B, and a master selector switch 84 also having a plurality of stations 86, one coupled to each of the master lessons, on the tape decks 24. Thereby, by indexing the master selector switch 84 to the stations 86 the entire student body by indexing to station 82 is automatically made to receive the same lesson, and changing lessons to the entire student body entails the one simple operation of indexing the master selector switch 84.

Also the control console 74 has a master intercommunications switch 88 with a talk and listen stations 90 and 92 respectively. When the master intercommunication switch 88 is on the listen station 92, the teacher receives, on the earphones 94 at the teacher position 72, the lesson from the master tape on the tape deck 24 selected by the master switch. When the master intercommunication switch 88 is at the talk station 90, microphone 96 is coupled into the circuit so that the teacher may speak directly to all of the students simultaneously, regardless of what station 78 the student selector switches 76 are on, except those in the off or self position which will be further described. The teacher's speaking volume may be controlled by volume control knob 98. The receiving volume to the headphones 94 may be varied by the listen volume control knob 100. When the master intercommunications switch 88 is in the listen station 92, a listen pilot lamp 102 will light. When the master intercommunications switch knob 88 is at the talk station 90, a record pilot lamp 104 will light. The teacher record volume becomes visible on a meter 106 in the record circuit and may be varied by control knob 98. Power to the system may be electrically turned on or off by an on-off switch 108. A power indicating lamp 110 will light when the power switch 108 is in the on position.

In the operation of the audio teaching aid system shown in FIG. 1, each student takes his position preferably on a chair (not shown) at the student positions 20 such as 50 and 52 and each student adjusts this headphone 60 and microphone 62 associated with the particular student position. The teacher likewise positions himself at the table 114 adjacent the control console 74. The teacher then checks the student selector switch arms 80 corresponding to the student positions as 50 and 52 to see that all are positioned to the same station 78 which selects the magnetic tape recorder tape deck 24 carrying the appropriate student lesson. The teacher then turns the power switch 108 to the on position causing the power to be turned on and the indicating lamp 110 to glow, thereby indicating that the system is now properly powered for operation. Then each student at his position such as 50 adjusts his playback-record switch 70 to the record position whereby he is connected to the circuit carrying the lesson from the appropriate tape deck 24 selected by the teacher on the station 78. In the case of foreign languages, the lesson on the tape deck 24 is preferably so arranged that periodically it has blank portions to give the student an opportunity to repeat portions of the lesson, answer questions according to instructions or otherwise participate in the lesson. When such a blank space appears, the student has the opportunity by talking into his microphone 62 to record his responses, so long as he leaves the playback-record switch 70 in the record position, which position also automatically causes the student record indicator lamp 68 to glow as an indication to him that the material which he hears in the headphone 60 and whatever he says in the microphone 62 is being recorded on his own individual student track on one of the tape decks 24 assigned to his student position.

If at any time during the lesson the teacher wishes to listen to the material appearing at any one of the student positions such as 50 or 52, the teacher need only move the individual student talk-listen switch 77 appropriate to the particular one of the student positions 20, to the listen position, to thereby effectively hear, in the teacher's earphones 94 all of the audible material reaching that particular student position.

By switching the student talk-listen switch 77 into the talk position the teacher's microphone 96 as well as the teacher's earphones 94 are coupled to the student position circuits, thereby permitting a two-way conversation with the particular student involved. This feature is important for the purpose of correcting errors of the student or giving further instructions with regard to the lesson.

In the event the teacher desires to make an announcement to the entire class, the teacher need only move the master intercommunication switch 88 to the talk station 90 to effectively reach all student positions with the teacher's microphone 96 except those in the "off" or "self" station of the student selector switches 76 which will be hereinafter further described.

Those students having a student selector switch 76 (FIGS. 1 and 3B) in the self position are directly coupled to the corresponding tape deck 24 independently of all other student positions and independently of the master or teacher position 72, thereby permitting the particular student to individually run through selected lessons for such purposes as review, or to make up lessons for time lost as to illness, or in the case of brighter students to set a pace commensurate with the student's ability.

The teacher may selectively set an automatic stop switch 112 (FIGS. 1 and 3A) to start, an automatic stop, or a stop position. In the automatic stop position the tape decks 24 which are of the endless belt type will continue to run through one complete cycle after which each will individually stop when the end of the lesson is reached. In the start position, the tape will continue to run through the lesson innumerable times without stopping, which condition is desirable where a student wishes to have the work repeated so that he might have the opportunity to listen to and analyze his responses during the blank periods in the lesson. In the stop position, all tape decks 24 and tape recorder playback drive motors 22 are immediately stopped.

In FIG. 3 the electrical arrangement of the audio teaching aid system 10 is shown schematically for only two student positions to illustrate the principles of construction and operational circuitry which may be followed for accommodating any number of student positions. In FIG. 3, the general contents of equipment cabinet 12 is shown partially schematically and partially in block form enclosed by broken lines 116. The teacher's control console 74 is enclosed by the broken lines 118 and the student positions 20 by the broken lines 120. In the FIG. 3 illustration, two representative student selector switches 76 are shown as rotary gang switches 122 and 124 respectively, each having four decks with multiple contact terminals. The gang switch 122 has switch arms 126, 128, 130 and 132 at each of the respective four decks in the switch, making contact with a selected one of a plurality of terminals at each deck and are insulated from and simultaneously rotated by a common shaft 134. Each of the four decks has terminals numbered 1 through 7, and a master, off and self terminals labelled "M," "off" and "self" respectively.

Similarly, the gang switch 124 has four switch arms 136, 138, 140, and 142 which may be moved rotatively by a common shaft 144 to selectively make contact with terminals numbered 1 through 7 and a master, off and self terminals labelled "M," "off" and "S" respectively on each of the four decks of the gang switch 124.

The master playback selector switch 84 is also of a gang switch variety having in the present instance two switching arms 146 and 148 mounted on and insulated from common shaft 150 for simultaneous rotative indexing to electric terminals 1 through 7 on each of the decks.

The master intercommunications switch 88 is also of the gang switch variety of which three decks, 152, 154, 160 each carrying a pair of electrical conductive contact members 162, 165, 166 respectively, mechanically coupled to a common shaft 168 for simultaneous rotation to the talk and listen stations 90 and 92 (FIG. 1).

A pair of double track tape recording and playback mechanisms 170 and 172 for the student positions 50 and 52 respectively, are shown in schematic form in FIG. 3A. It should be understood that additional student positions as desired may be similarly arranged and accommodated by the use of the principles herein described. Each of the double track tape recorder and playback mechanisms 170 and 172 include electric motors 22 individually coupled through normally closed switch arms 174 and 176 of automatic individual tape recorder stopping relays 178 and 180 respectively to a 110-volt power line 182. The power line 182 is coupled through a tape recorder power cutoff relay 184 to the alternating current power source 34. The tape recorder power cutoff relay 184 has a control solenoid 186 coupled at one end to a 24-volt power line 188 and at the other end through a switch arm 190 in the automatic stop switch 112 and through terminal 192 to power line 194. The power lines 188 and 194 are coupled across a 24-volt power supply 196 of conventional design which itself is coupled to the alternating current power source 34 through a master power relay 198. The master power relay 198 has a control solenoid 200 coupled in the output circuit of a standby 24-volt power supply 202 also carrying a power on-off switch 108. The standby power supply 202 is coupled through a standby switch 204 to the alternating current power source 34.

The automatic stop switch 112 has a second switch arm 205 which couples the power line 194 through terminal 207, terminal 1 and switching arm 126 in the top deck of the student selector switch 76, to a tape sensitive terminal 206 on the dual track recorder and playback tape 208. The dual track tape 208 also carries another tape sensitive terminal 210 opposite the terminal 206 and coupled through one end of a control solenoid 212 in the automatic individual tape recorder stopping relay 180, the other end of which is coupled to the power line 188.

In similar manner, terminal 207 of the automatic stop switch 112 is also coupled through terminal 1 and switching arm 136 of the top deck in the student selector switch 124 to a tape sensitive terminal 214 similar to the tape sensitive terminal 206, on a dual track recorder and playback tape 216 in the tape recorder and playback mechanism 172. A second tape sensitive terminal 218 similar to the terminal 214 is coupled through a control solenoid 220 to the 24-volt power line 188.

Thus, it will be noted that when the tape 208 is moved in the direction of the arrow 221 from spool 222, which is driven through a linkage 224 by the motor 22, a vertical strip of conductive paint or other electrically conductive material 226 on the tape 208 will make contact between tape-sensitive terminals 210 and 206, thereby closing the circuit comprised of power line 194, terminal 207, and switch arm 205 in the automatic stop switch 112, switching arm 126 and terminal 1 in the student selector switch 122, terminals 206 and 210, control solenoid 212 in the automatic individual tape recorder stop relay 180, and the power line 188. Closing the circuit in this manner thereby energizes the automatic individual tape recorder stopping relay 180 to simultaneously pull the switch arm 176 and switch arm 228 downwardly so as to open the circuit from the power line 182 to the motor 22 in the tape recording and playback mechanism 170 and to close the circuit containing terminal 1 and switching member 126 in the student selector switch 122 to thereby maintain an energized control solenoid 212 even after the electrically conductive strip 226 passes the tape sensitive terminals 206 and 210 to open the circuit therebetween.

In similar manner, an electrically conductive strip 230 on the tape 216 will engage the terminals 214 and 218 so as to close the circuit when the tape 216 is moved in the direction of arrow 232 on spool 234 which is driven through a drive linkage 236 by the motor 22 in the tape recording and playback arrangement 172. This circuit closing will energize the control solenoid 220 to pull downwardly the switch arm 174 and switch arm 238 in the automatic individual tape recorder stopping relay 178. The switch arm 238 will then close the circuit containing terminal 1 and switching member 136 in the student selector switch 124 to thereby continue to energize control solenoid 220 even after the electrically conductive strip 230 passed the terminals 214 and 218.

Thus it is noted that when the automatic stop switch 112 has the arms 205 and 190 in the automatic stop position as shown in FIG. 3, each of the tape recorder and playback mechanisms 170 and 172 will stop independently itself when its respective stop control conductive strip 226 or 230 passes the respective automatic tape sensitive terminals 206 and 210, or 214 and 218, thus, automatically synchronizing each of the recorder and playback tapes 208 and 216 independently so as to set it in its appropriate starting position for a repeat of the entire tape when desired.

By moving the switch arms 190 and 205 downwardly so that the switch arm 190 is on the terminal 238 and the switch arm 205 is on the terminal 240, the circuit from control solenoid 186 in the tape recorder power cutoff relay 184 is thereby broken to the power line 194 at the switch arm 190 so as to de-energize the control solenoid 186 and cause a spring element 241 to pull switch arms 243 upwardly so as to break the circuit in the power line 182 immediately stop all of the tape recorder playback drive motors 22 simultaneously.

When the switch arm 205 is moved up to terminal 242 it will open the circuit from the "M" and numbered top deck terminals of student selector switch 122 to the power line 94 and the switch arm 190 will be on the terminal 244 to retain a closed circuit to the control solenoid 186 thereby energizing control solenoid 186 to hold the switch arms 243 in closed position in the power line 182 as shown in FIG. 3. With switch arm 205 on the terminal 242, the circuit through the switching arms 126 and 136 to the automatic individual tape recorder stopping relays 180 and 178 respectively will not become energized unless the switching members 126 and 144 are indexed to the "off" or "self" positions for purposes to be hereinafter described.

The tape recording and playback mechanism 170 has a master playback head 245 located adjacent a master or lesson track on the dual track record and playback tape 208. The master playback head 245 is coupled to ground at one side and is coupled through a master playback amplifier 246 to terminals 248 and 250 on deck 152 of the master intercommunications switch 88.

It should be noted that when the automatic stop switch 112 has moveable arms 205 and 190 on terminals 207 and 192 respectively as shown in FIG. 3A the circuit from power line 194 through switch arm 205, switching arms 126 and 136 in the top decks of the student selector switches 122 and 124 respectively, and the respective tape sensitive contacts 206–210, and 214–218 to the control solenoids 212 and 220 for the respective tape recorder and playback mechanisms 170 and 172 will be completed when the vertical conductor strips 226 and 230 touch the respective automatic tape sensitive terminals. When the conductive strip 226 touches the automatic tape sensitive terminals 206 and 210 in the tape recording and playback mechanism 170, the automatic individual tape recorder stopping relay 180 will be energized so as to move the relay arms 176 and 228 downwardly against tension from a spring 251. The relay arm 176 in relay 180 will thereby open the circuit to the power line 182 so as to stop the motor 22. The relay arm 228 will close the circuit from contact arm 247 through the solenoid 212 to the 24-volt power line 188, thereby continuing to energize the relay 180 even after the vertical conductive strip 226 passes the tape sensitive terminals 206 and 210 so as to break the circuit therebetween.

In similar manner, the vertical conductive strip 230 will cause the automatic individual stopping relay 178 to be energized so as to pull relay arms 174 and 238 downwardly to open the circuit to the power line 182 to thereby stop the motor 22 in the tape recording and playback mechanism 172 and similarly cause relay arm 238 to close the circuit to the contact arm 248 in the student selector switch 124 and through the control solenoid 220 to the 24-volt power line 188, thereby continuing to energize the automatic individual tape recorder stopping relay 178 after the electrically conductive strip 230 passes the tape sensitive terminals 214 and 218.

When the moveable switch arms 205 and 190 in the automatic stop switch 112 are moved downwardly to the terminals 240 and stop terminal 233 respectively, the circuit from the 24-volt power line 188 through the control solenoid 136 of the tape recorder power cutoff relay 184 is broken at the terminal 238 so as to de-energize the control solenoid 186 and thereby permit switch arms 244 to be pulled upwardly by the spring 241 so as to break the circuit 182 to all of the motors 22 in all of the tape recorder and playback arrangements such as 170 and 172. Such simultaneous stopping would be desirable when the teacher desired to communicate or talk to all of the students simultaneously over the teacher microphone 96 as will be hereinafter further described.

When the moveable switch arms 205 and 190 in the automatic stop switch 112 are on the terminals 242 and 244 respectively they are in what is known as the "Start" position wherein the circuit from 24-volt power line 188 and 194 is completed through the terminal 244 and moveable switch 190 so as to energize the control solenoid 186 of the tape recorder power cutoff relay 184 to cause moveable switch arms 243 therein to close the circuit in power lines 182 through the tape recorder and playback drive motors 22.

However, with moveable switch arm 205 on the terminal 242, the individual automatic tape recorder stopping relays such as 180 and 178 can never be energized even when electrically conductive strips 226 and 230 close the circuit between tape sensitive terminals 206 and 210, and 214 and 218 respectively. The endless tapes 208 and 216 will thereby continue to repeat the lesson on the tape. Such repetitive playback of the lesson becomes desirable in the learning process by giving students the opportunity to compare their responses, as recorded on the tape, with those of the teacher from the lesson master.

Each student position, such as student position 50, has a set of earphones 60 coupled through coaxial cable lines 252 and 254 to the output of an audio-amplifier 256 in the tape recording and playback mechanism 170. The audio amplifier 256 has three input channels, one being from the microphone 62 in the student position 50 through an input amplifier 253, a second input to the audio amplifier 256 is through a cable 260 and moveable switch arm 262 in the playback selector switch relay 264 having solenoid 1C. The adjustable contact arm 262 is normally held by a spring 266 on a terminal 268 electrically coupled to a terminal 270 common to moveable switch arms 272 and 274 in a student talk-listen selector relay 276 having solenoid 1B. The moveable switch arms 272 and 274 are coupled to operate in unison with a moveable switch arm 273 normally held by energized solenoid 1B overcoming a spring 280 on a terminal 282 which is coupled to one side of a student track erase head 284, the other side of which is coupled through a line 288 leading to the output of an erase amplifier 290, the other line 292 from which is coupled through the moveable switch arm 278 in the student talk-listen selector relay 276. The erase amplifier 290 is coupled to the output of an erase oscillator 296 whose input is coupled across the 24-volt power lines 188 and 194.

The one side of a student record and playback head 298 located at the student track of the recorder tape 208 is shown coupled through moveable switch arm 272, a relay terminal 300 and a line 302 to the output of a student record amplifier 304, the input side of which is coupled across the student earphone lines 252 and 254.

The third input to the audio amplifier 256 is coupled through lines 306 and 308 to moveable switch arms 310 and 312 respectively in the individual student talk-listen switch 77 associated with the student position 50.

The moveable arm 312 is normally in contact with a terminal 314 coupled to a moveable arm 316 in a master playback cutoff relay 318 at the student selector switch 122. The moveable arm 316 is normally held by energized relay 318 overcoming a spring 320 against a terminal 322 electrically coupled through contact arm 324, switching member 128, terminal number 1 in the second deck of the student select switch 122 and line 326 to terminal 328 in deck 152 of the master intercom switch 88.

The moveable switch arm 310 is normally in contact with a terminal 330 which is electrically coupled to a second moveable switch arm 332 in the master playback cutoff relay 318. The moveable arm 332 is coupled to move in unison with the moveable switch arm 316 and normally held by energized relay 318 in contact with terminal 334 which is coupled through a contact arm 336, switching member 130, terminal number 1 in the third deck of the student selector switch 122, and a line 338 to a terminal 340 in deck 152 of the master intercom switch 88.

The moveable arms 310 and 312 in the individual talk-listen switch 77 also can be made to contact terminals 341 and 342 respectively coupled to the output of a microphone amplifier 344 which has the teacher microphone 96 coupled to its input.

The output of the teacher microphone amplifier 344 is also coupled through lines 346 and 348 to terminals 350 and 352 on the deck 154 of the intercom switch 88 and to terminals 354 and 356 respectively on the deck 152 of the master intercom switch 88 and in similar manner on every other deck of the intercom switch 88 respresenting a student position as explained above. The moveable switch arms 316 and 332 in the master playback cutoff relay 318 are also capable of contacting electrically interconnected terminals 534 and 536 respectively to effectively short out input lines 306 and 308 to the amplifier 256 as when a student is recording as will be hereinafter further described.

The individual talk-listen switch 77 adjoining the student selector switch 122 also has moveable arms 358 and 360 coupled across the output lines 252 and 254 respectively from the amplifier 256 to the student earphones 60 in the student position 50. The moveable arms 353 and 360 are preferably moveable between three positions, a neutral set of terminals 362 and 364 respectively, terminals 366 and 368 on one side of each of the switch arms 358 and 360 respectively, and terminals 370 and 372 on the other side of the moveable switch arms 358 and 360 respectively. The terminals 366 and 370 are coupled to line 374 and the terminals 368 and 372 are coupled to line 376 across which the teacher's earphones 94 are located. The individual talk-listen switch 77 is of a type such that when the moveable arms 358 and 360 are on the neutral terminals 362 and 364 respectively or on the terminals 370 and 372 respectively, the moveable arms 310 and 312 will be on the terminals 330 and 314 respectively. Whereas, when the moveable arms 360 and 362 are on the terminals 368 and 366 respectively, the moveable arms 310 and 312 will be on the terminals 341 and 342 respectively. Thus, with the moveable switch arms 360, 358, 310 and 312 in the positions shown in FIG. 3B, the teacher's microphone 96 and the earphones 94 are disconnected from the student amplifier 256 by the individual talk-listen switch 77 which as shown is in the normal operating position, as is also the master intercom switch 88 for feeding playback information from the master playback head 245 on the tape 208 in the tape recording and playback mechanism 170 to the student position earphones 60 in the student position 50.

If the teacher wishes to listen to the information coming in over the lines 252 and 254 to the student earphones 60 of the student position 50, he need only shift the moveable arms 358 and 360 of the individual talk-listen switch 77 adjoining the student selector switch 122 to terminals 370 and 372 respectively to thereby receive through lines 374 and 376 the information to the teacher earphones 94, the intensity of which may be adjusted on the variable resistor 378.

In the event the teacher desires to speak to the student at student position 50 alone and carry on a two-way conversation with the student, he need only move the switch arms 358 and 360 to the terminals 366 and 368 respectively whereby the moveable switch arms 310 and 312 will automatically move to the terminals 341 and 342 respectively so as to couple the teacher microphone 96 through amplifier 344 and lines 306 and 308 to the amplifier 256 to thereby reach the student earphones 60 at position 50 through the amplifier output lines 252 and 254.

In a similar manner, the talk-listen switch 77 adjacent to the student selector switch 124 for the student position 52 has moveable arms 380 and 382 coupled to lines 384 and 386 running from the amplifier 388 in the tape recording and playback mechanism 172 to the earphones 60 in the student position 52. Movement of the moveable arms 380 and 382 to the terminals 389 and 390 coupled to the lines 376 and 374 respectively, thereby permits the audio information reaching the student earphones 60 at student position 52 to also be heard on the teacher's earphones 94.

The individual talk-listen switch 77 adjacent the student selector switch 124 also has moveable arms 392 and 394 coupled through terminals 400 and 402 and lines 396 and 398 respectively to the input of the amplifier 388. The moveable arms 392 and 394 are also coupled to moveable arms 404 and 406 respectively in a master playback cutoff relay 408 with a solenoid 2A for operation with the student selector switch 124 for student position 52. The moveable arms 404 and 406 are coupled to move in unison and normally held by energized solenoid 2A overcoming a spring 410 upwardly against respective terminals 412 and 414. The terminal 412 is electrically coupled through contact arm 416, switching member 138, terminal number 1 in the second deck of the student selector switch 124, to line 326 leading to terminal 328 in deck 152 of the master intercom switch 88. The terminal 414 is electrically coupled through contact arm 418, switching member 140, and terminal number 1 in the third deck of the student selector switch 124, to the line 388 leading to the terminal 340 in deck 152 of the master intercom switch 88. When solenoid 2A is deenergized, the moveable switch arms 404 and 406 are simultaneously moved downwardly to terminals 420 and 422 so as to effectively short out lines 396 and 398 to prevent audio information from passing through switch arms 404 and 406 to lines 396 and 398 leading to the input of the amplifier 388.

With the switch arms 404 and 406 on terminals 412 and 414 as shown, playback information from the master playback head 245 at the magnetic tape 208 passing through playback amplifier 246 and terminals 250 and 248 in stage 152 of the master intercom switch 88 will pass through lines 396 and 398 to the input of the amplifier 388 and thereby will reach the earphones 60 of the student position 52 for audio reception. When the moveable arms 392, 394, 380 and 382 are moved upwardly, the teacher's microphone 96 and earphone 94 are coupled to the input and output respectively of the amplifier 388 to thereby permit the teacher to carry on a two-way conversation with the student position 52 as explained above in connection with the student position 50. Whereas, if the teacher wishes merely to listen to the audio signals appearing in lines 394 and 396 in the student position 52, the switch arms 380 and 382 in the talk-listen switch 77 adjacent the student selector switch 124 need only be pushed downwardly from their shown neutral position onto terminals 389 and 390 to thereby couple lines 374 and 376 from the teacher earphones 94 to the lines 384 and 386.

If the teacher wishes to speak to all of the student positions such as 50 and 52 simultaneously, the master intercom switch 88 is moved to the right on pivot 153 to couple one of electrical contacts 162 to terminals 328 and 354 and the other to terminals 340 and 356 thereby breaking the circuit to the master playback head 245 and inserting in the circuit instead the teacher's microphone 96 through lines 346 and 348.

In the tape recording and playback mechanism 172, a master playback head 424 located on the master track of the magnetic tape 216 has its playback output coupled to a line 426, a master playback amplifier 428 and lines 430, 432 to terminals 434 and 436 respectively on deck 154 of the master intercom switch 88. The terminal 436 is coupled through one of the electrical contact members 164 and terminal 438 to line 440 which leads to the terminal number 2 on the third deck of each of the student selector switches 122 and 124 as well as on the second deck of the master playback selector switch 84. The terminal 436 is coupled through the other electrical contact member 164, and terminal 442 to line 444 leading to all of the terminals number 2 on the second deck of the student selector switches 122 and 124 as well as on the first deck of the master playback selector switch 84. Thus it will be noted that the deck 154 in the master intercom switch 88 may be used to couple the master playback head 424 to the terminals number 2 on the second and third decks of the student selector switch 84, while deck number 152 of the master intercom switch 88 couples the master playback head 245 to terminals number 1 as explained on the above second and third decks of the student selector switches 122 and 124 and both decks of the master playback selector switch 84. If additional master playback heads are used, additional decks in the master intercom switch 88 are provided, one for each additional master playback head used, and they will couple to consecutive numbers 3, 4, 5, 6, and 7 on the second and third decks of the student selector switches 122 and 124 as well as on the master playback selector switch decks 84.

The output line 426 from the master playback head 424 is also coupled to a terminal 446 in a student playback selector relay 448 similar to the playback selector relay 264. The playback selector relay 448 has a moveable switch arm 450 coupled through a line 452 to a second input to the amplifier 388. The moveable arm 450 is normally held by a spring 454 against a second terminal 456 coupled through a terminal 458 and a moveable switch arm 460 in a student talk-listen selector relay 462 to ground. The student talk-listen selector relay 462 also has a pair of moveable switch arms 464 and 468 coupled to move in unison with the moveable switch arm 460 and held by energized solenoid 2B overcoming a spring 470 normally upwardly so that the moveable switch arm 464 is electrically engaging a terminal 472 connected to the output of an amplifier 474 having an input coupled across the lines 386 and 384 leading from the output of the student amplifier 388.

The moveable arm 488 is also normally held against a terminal 476 which is coupled to one side of an erase head 478 on the student track of the magnetic tape 216, the other side of which is coupled through the line 288 to the output of the erase amplifier 290 which has its other output line 292 coupled to the moveable arm 468. A terminal 481 in the relay 462 is also operable for coupling the moveable switch arm 460 to the output of the amplifier 474.

It will be noted that with the moveable arms 468, 464, and 460 in the positions shown in FIG. 3A, the audio output appearing in lines 386 and 384 from the student amplifier 388 will also appear through the amplifier 474, terminal 472, moveable arm 464 and will be fed to the student record playback head 482 for recording on the magnetic tape 216. At the same time the erase head 478 will be energized from the erase oscillator 296 to insure a clean track on the tape 216 as it passes in the direction of the arrow 232.

When the moveable arms 468, 464 and 460 are moved downwardly, upon the student talk-listen selector relay 462 being de-energized as will be hereinafter described, the output of the amplifier 474 will be grounded through the terminal 481 and moveable switch arm 460 to ground. The erase head 478 will become inoperative due to the open circuit between terminals 476 and moveable arm 468 and the record-playback head 482 will playback through moveable arm 464, terminal 458, terminal 456, moveable switch arm 450, line 452, student amplifier 388 and lines 386, 384 to the earphones 60 at the student position 52.

It will be noted that the energizing coils 1B and 2B, for the student talk-listen selector relays 276 and 462, and coils 1C and 2C for the playback selector relays 264 and 443 appear physically in the 24-volt relay energizing power circuit 482 coupled to the output of the 24-volt power supply 196 by lines 484 and 486. The master playback cutoff relays 318 and 408 are coupled across the power lines 484 and 486 through electric lamps 488 and 490. The playback selector relay 264 and student talk-listen selector relay 276 are coupled in series from power line 484 to a contact arm 492 in electrical engagement with the switching member 132 on the fourth deck of the student selector switch 122 which has the terminals marked "off" and "self" coupled back to the 24-volt power line 486. In similar manner the energizing solenoids 2B and 2C of the student talk-listen selector relay 462 and the playback selector relay 448 are coupled in series from the 24-volt power line 484 through a contact arm 494 to the switching member 142 in the fourth deck of the student selector switch 124 which also has the terminals marked "off" and "self" coupled to the power line 486. A point between the solenoids 1B and 1C of the relays 264 and 276 is coupled through a line 496 to a moveable arm 498 in a student talk-listen switch 500 (heretofore referred to with respect to student position 50 as a record-playback switch) having a record or talk terminal 502 electrically coupled to the power line 486 and a playback or listen terminal 504 electrically coupled through line 506, terminal 508, electrical contact member 166, terminal 510 to power line 484. A similar student talk-listen switch 514 for the student position 52 has a moveable arm 516 coupled through a line 518 to a point between solenoids 2B and 2C in relays 462 and 448 respectively. The adjustable arm 516 is arranged to make contact selectively with a talk or record terminal 520 coupled to the 24-volt power line 486 and a playback or listen terminal 522 coupled to the line 506 leading to the terminal 508. A lamp 524 is coupled across the moveable arm 516 and the talk or record terminal 520. When the student talk-listen switches 500 and 514 have the moveable arms 498 and 516 respectively in the position shown in FIG. 3B talk or record terminals 502 and 520 respectively, the record-indicator lamps 68 and 52 respectively will be extinguished thereby indicating the talk or record position. The circuit comprised of power line 486, listen terminal 502, moveable arm 498, line 496, student talk-listen selector relay 276, and the power line 484 cause relay 276 to be energized. Also, the parallel master playback cutoff relay 318 coupled from line 496, line 506, terminal 508, electric contact member 166, terminal 510, and power line 484 is thereby energized.

With the moveable arm 498 on the talk or record terminal 502 of the student talk-listen switch 500 of the student position 50, the record indicator lamp 68 will remain extinguished to indicate the talk or record position of the switch 500, and the master playback cutoff relay 318 at the student selector switch 122 will be energized as will also be the student talk-listen selector relay 276 at the tape recording and playback mechanism 170 be energized as explained above.

Energizing the master playback cutoff relay 318 will cause moveable arms 316 and 332 to engage terminals 322 and 334 respectively leading through the second and third decks of the student selector switch 122 and the master intercom switch 88 to the output of the master playback amplifier 243 which is coupled to the master playback head 245 on the master track of the magnetic tape 208. Thereby the lesson or other information on the master track of the magnetic tape 208 will pass through the moveable arms 316 and 332, terminals 330 and 314 respectively, moveable arms 310 and 312 respectively in the individual talk-listen switch, through lines 306 and 308, the student master amplifier 256, lines 252 and 254 to the earphones 60 in the student position 50.

Energizing the student talk-listen selector relay 276 causes moveable arms 274, 272 and 278 to engage terminals 270, 300, and 282 respectively. Moveable arm 278 on the terminal 282 thereby closes the circuit from the erase amplifier 290 to the student erase head 284 on the student track of the magnetic tape 208. The moveable arm 272 engaging the terminal 300 thereby closes the circuit from the student record amplifier 304 to the student record and playback head 298 on the student track of the magnetic tape 208 to thereby effectively record all information appearing in lines 252 and 254 from the student master amplifier 256. Moveable arm 274 engaging the terminal 270 thereby closes the circuit of line 260 to ground, to prevent any undesired signals reaching the master student amplifier 256.

In the event the teacher wishes to listen to the program appearing in lines 252 and 254 to the earphones 60 of the student position 50, individual talk-listen switch 77 adjacent to student selector switch 122 may have its moveable arms 360 and 362 moved downwardly to engage terminals 372 and 370 respectively to thereby couple the teacher's earphones 94 to the lines 252 and 254. The sound level of the teacher's earphones 94 may be set to a comfortable level by adjustment of the potentiometer resistor 378.

In the event the teacher wishes to engage in a two-way conversation with the student individually at position 50 the individual talk-listen switch 77 adjacent the student selector switch 122 is caused to have all of the moveable arms 360, 358, 310 and 312 moved upwardly to engage terminals 368, 366, 341 and 342 respectively. The teacher earphones 94 thereby remain coupled to the lines 252 and 254 as explained above. The moveable arms 310 and 312 engaging the terminals 341 and 342 thereby couple the microphone 96 to lines 306 and 308 to the input of the master student amplifier 256 leading to the earphones 60 at the student position 50.

In similar manner, the student at student position 52 can listen and record a lesson and his response by placing adjustable arm 516 on the terminal 520 as shown in FIG. 3B. This will cause the record indicator light 524 to be extinguished to thereby indicate the talk or record position, and will energize master playback cutoff relay 408 and student talk-listen selector relay 462 at the tape recording and playback mechanism 172. Energizing the master playback cutoff relay 408 at the student selector switch 124 causes moveable arms 406 and 404 to engage terminals 412 and 414 respectively to thereby complete the circuit through the second and third decks of the student selector switch 124 and the top deck of the master intercom switch 88 which represent the master playback amplifier 246 whose input is coupled to the master playback head 245 on the master track of the magnetic tape 208. Thereby the output from the master playback head 245 will appear through moveable arms 404 and 406 of the student selector switch 124 and terminals 400 and 402 respectively, moveable arms 392 and 394 respectively of the individual talk-listen switch 77 adjacent the student selector switch 124, lines 396 and 398 respectively to the input of the master student amplifier 388 and output lines 386 and 384 to the student earphone 60 in the student position 52.

Energizing the student talk-listen relay 462 causes moveable arms 468, 464, 460 to engage terminals 476, 472 and 458 respectively. Moveable arm 468 on the terminal 476 closes the circuit from the erase amplifier 290 to the erase head 478 on the student track of the magnetic tape 216. The moveable arm 464 on the terminal 472 closes the circuit from the student record amplifier 474 to the student record and playback head 482. The moveable arm 460 on the terminal 458 effectively grounds line 452 to an input of the student master amplifier 388, to prevent extraneous noise or other signals reaching the student amplifier 388 through the line 452. Thereby the student at the student position 52 will hear in his earphones 60 the lesson or other information picked up by master recording and playback head 245. This program appearing in lines 386 and 384 will be continuously recorded by the student recorder head 482 on the student track of the magnetic tape 216.

In the event the teachers wishes to listen to the information appearing in lines 386 and 384, the individual talk-listen switch 77 adjacent the student selector switch 124 may be moved downwardly to cause moveable arms 380 and 382 to engage terminals 389 and 390 respectively to thereby couple the teacher earphones 94 directly to the lines 384 and 386.

To carry on a two-way conversation with the student at the student position 52, the moveable arms 380, 382, 392 and 394 are moved upwardly in the individual talk-listen switch 77 at the student selector switch 124 to cause the moveable arm 392 and 394 to engage the terminals to lines 396 and 398 leading to an input of the master student amplifier 388, thereby coupling the teacher microphone 96 and the teacher microphone amplifier 344 to the master student amplifier 388, permitting a two-way conversation with student position 52.

In the event the teacher wishes to make an announcement to all of the students such as students at positions 50 and 52, the master intercom switch 88 is rotated to the right. Such rotation of the master intercom switch 88 causes the pair of electric members 166 on the third deck to electrically couple terminal 508 and terminal 526 so as to de-energize master playback cutoff relays 318 and 408. Electrical contact member 166 also couples terminals 528 and 530 on the third deck of the master intercom switch 88 so as to cause lamp 532 to glow as an indication of the coupling of this master intercom switch announcement position. The de-energizing of master playback cutoff relay 318 causes the moveable switch arms 316 and 332 to be pulled downwardly by the spring member 320 so as to engage interconnected terminals 534 and 536 respectively and thereby breaking the circuit to the master playback head 245.

In similar manner, de-energizing the master cutoff relay 408 causes the moveable arms 406 and 404 to be pulled downwardly by spring 410 to similarly break the circuit to the master playback head 245.

Figure 4:
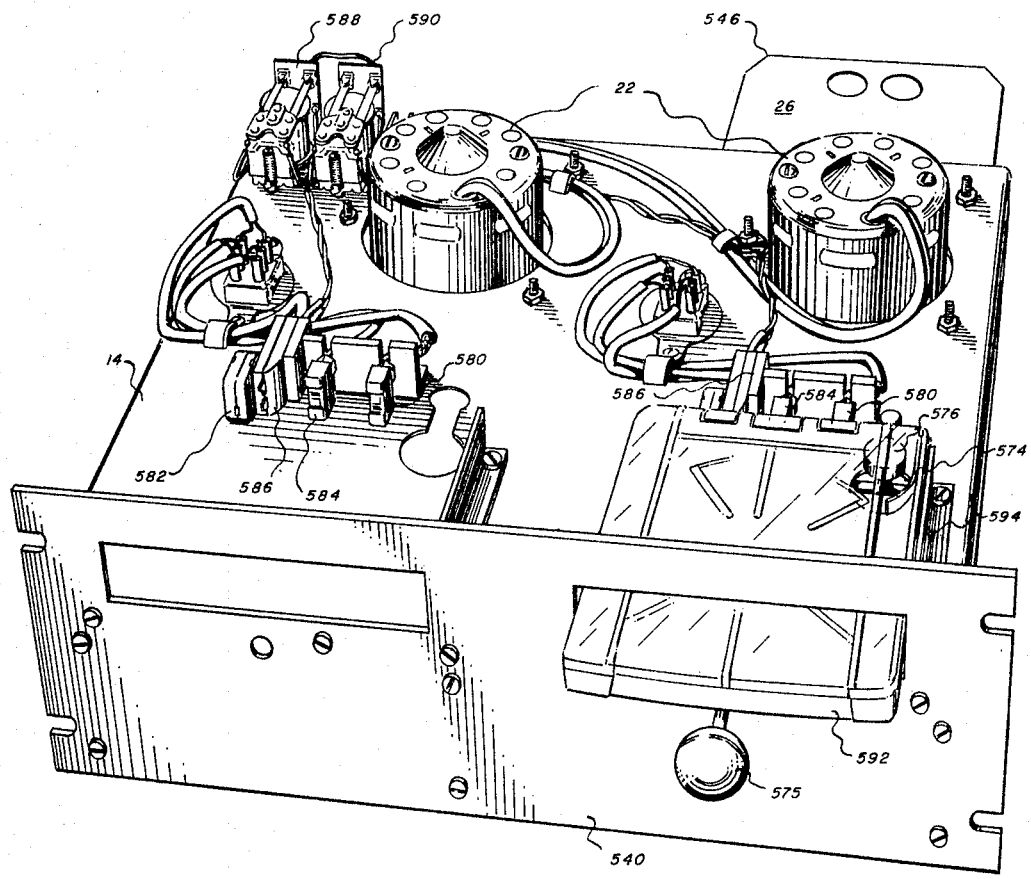
FIG. 4 is a view of an equipment rack suitable for use in the equipment cabinet illustrated in the FIG. 1 embodiment.

Referring to FIG. 4 in more detail, an isometric view of the equipment rack 14 used in the FIG. 1 embodiment is shown fastened to a panel 540 which may be fastened to the cabinet 12 in similar manner to that of the panels 16 and 48. It will be noted that the panel 540 is an alternative construction to that of the panels 16 in that the panel 540 does not contain the upwardly swinging hinged doors 42 for front panel removal of the amplifier 26. In this alternative type construction, the amplifier 26 which has all of the amplifier components 542 (FIG. 5) on a board of dielectric material, such as epoxy resin, is slidably carried between guide runners 546 and has a multi-channel plug 548 engaging corresponding terminals in a multi-channel receptacle 550 fixed to the back side of the panel 540 for proper connection of the amplifier 26 to other components in the system as described above.

This construction with its ready removability of the amplifier 26 thereby provides a rapid and easy arrangement for servicing by permitting the complete removal of one amplifier 26 and replacement by an entirely new properly operating amplifier in the matter of a moment to avoid "down time" of the equipment.

Figure 5:
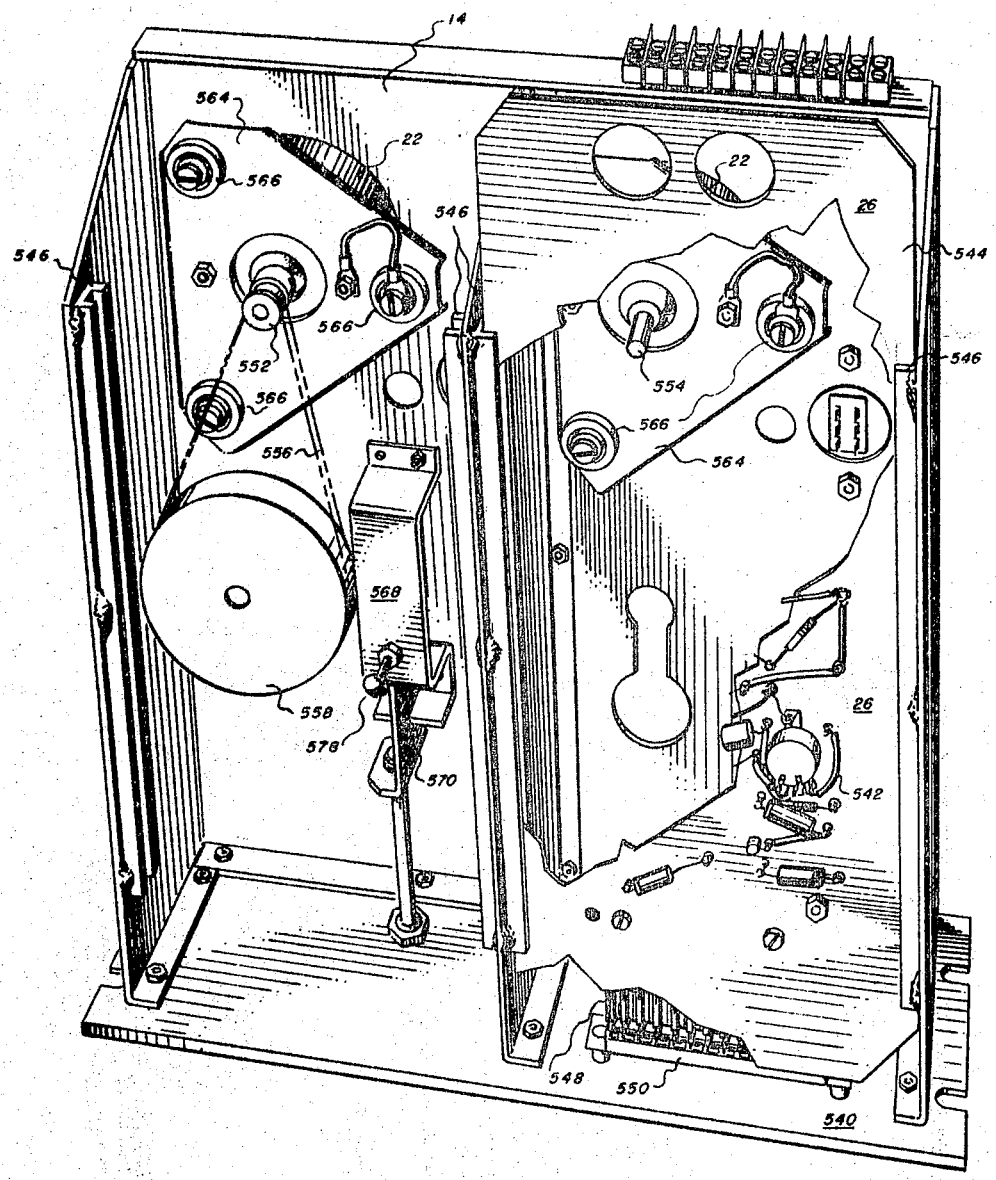
FIG. 5 is a view of the underside, with cutaway section, of the equipment rack shown in FIG. 4 to more clearly show construction.

Rack 14 carries mechanical and electrical tape recorder equipment for two student positions and includes a pair of tape recorder drive motors 22 each with a spindle drive pulley 552 on a shaft 554 with a belt 556 driving another pulley 558 which is mounted to operate a recorder tape drive spindle 560 carried in a bearing structure 562. In FIG. 5 it should be noted that the amplifier 26 has been removed from the guide runners 546 at the left student position to show construction of components thereunder, and for similar reasons, the amplifier board 544 at the right side of the illustration is in cutaway section together with some of the components removed such as the pulleys 558 and 552. The motors 22 are fixed to triangular shaped mounts 564 each carried by three resilient shock absorbing elements 566 fastened to the rack 14.

Figure 6:
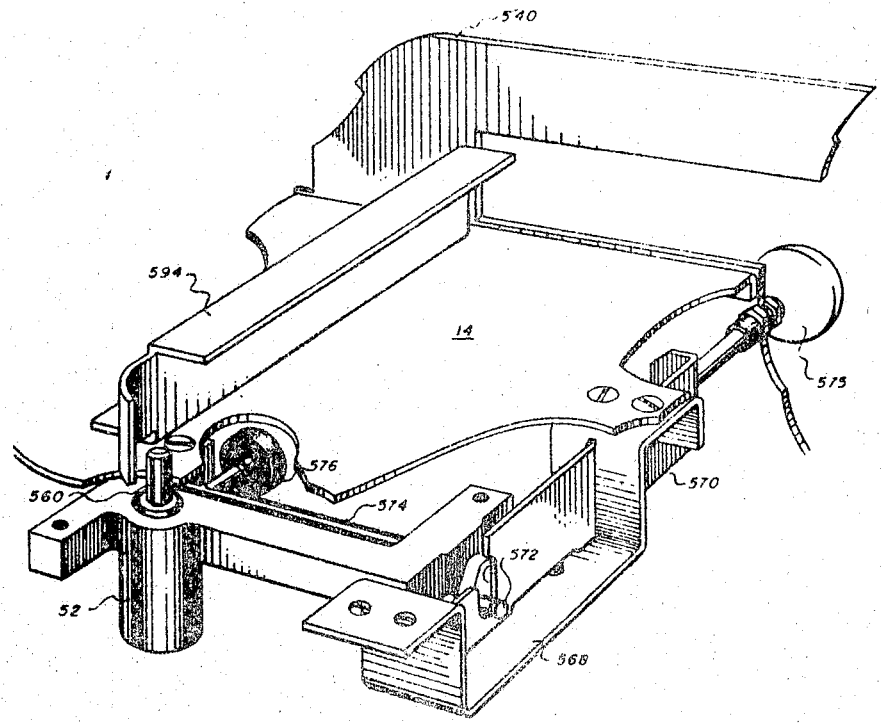
FIG. 6 is a view of a portion of the equipment rack shown in FIGS. 4 and 5 to more clearly show construction of the tape deck and locking drive mechanism with the tape drive idler disengaged.
Figures 7, 8:
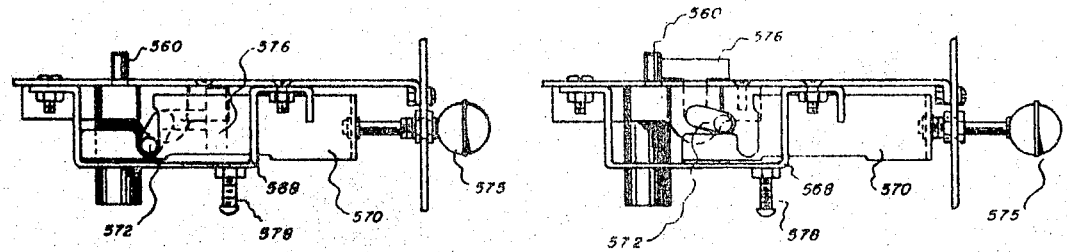
FIG. 7 is a side view of the structure shown in FIG. 6 with the tape drive mechanism plunger pushed inwardly to disengage the tape drive idler pinion from the tape drive spindle.
FIG. 8 is a side view of the structure shown in FIG. 6 with the tape drive mechanism plunger pulled outwardly to engage the tape drive idler pinion against the tape drive spindle.

Also fastened to the underside of the rack 14 at each recorder position is a bracket 568 slidably carrying an actuator arm 570 arranged to operate a lever 572 fixed to a rotary idler shaft 574 (FIG. 6) carrying an idler pulley 576 which swings upwardly to engage the tape drive spindle 560 when knob 575 is pulled outwardly as shown in FIG. 8. The force with which the idler pulley 576 engages the tape drive spindle 560 may be varied by an adjusting screw 578. The idler pulley 576 is retracted by the lever 572 when the knob 575 is pushed forward as shown in FIGS. 6 and 7.

Also fixed in each recorder position on the rack 14 is a student playback head 580 suitable for use as student playback heads 484 and 298 described above, and a student track erase head 582 suitable for use as the erase heads 478 and 284. Also fixed to the rack 14 is a master playback head 584 suitable for use as head 245 and 424 and a pair of auto-stop terminals 586 suitable for use as the terminals 214, 218 and 206, 210 described above. Relays 588 and 590 fixed to the rack 14, one for each of the drive motors 22 are coupled to operate from the auto-stop terminals 586 in manner similar to that described in connection with the relays 178 and 180. The tape recorder cartridge 592 having a continuously operating endless tape therein such as that known commercially as a Fidelipack cartridge is shown in FIG. 4 inserted in operating position on the rack 14 and is suitable for use as the above described tape recorder cartridge 24.

Slide or guide members 594 are provided on the rack 14 to facilitate sliding the tape recorder cartridge 592 in place. The tape recorder cartridge 592 with its inclosed recorder and playback tape is suitable for use to operate as the tape 208 and 216 in the tape recorder mechanisms 170 and 172.

This invention is not limited to the specific details of construction and operation described as equivalents will suggest themselves to those skilled in the art.

What is claimed is:

1. In an audio teaching aid system, the combination of a plurality of teaching lesson playback means, each having a sound and return lines; a plurality of record and playback equipments, each having a sound and return lines; a plurality of student positions remote from the teaching lesson playback means and the record and playback equipments with one of said student positions for each of said remotely located record and playback equipments, each of said student positions including a switch having a talk and listen positions, an earphone and a microphone; electric circuit means coupling said student microphone to said student earphone for student earphone reception of sound in said student microphone; a control console in remote relation to said student positions, said control console including a plurality of multideck, multistation student selector gang switches on a common shaft for simultaneous indexing of said decks to said respective stations, one of said student selector gang switches for each of said remotely located student positions, one of said stations on each of said plurality of student selector gang switches for each of said teaching lesson playback means, an additional one of said stations on each of said plurality of student selector gang switches being a master station, one of each of said student selector gang switch decks being a lesson playback sound line deck, another of each of said student selector gang switch decks being a lesson playback return line deck, a third of each of said student selector gang switch decks being a low voltage automatic lesson playback stop relay control deck; electric circuit relay means coupled to each of said record and playback equipments and in responsive relation to the corresponding automatic stop control deck for automatically stopping said respective record and playback equipment at a preselected position; said control console also including a multideck, multistation lesson selector master gang switch on a common shaft for simultaneous indexing of said master lesson selector switch decks to said master selector switch stations, one of the master selector switch stations for each of said teaching lesson playback means; electric circuit means coupling said master station of each of said student selector switches to said master lesson selector switch; said control console also including a multideck, master intercommunications switch on a common shaft for simultaneous station indexing of said master intercommunications switch decks, one of said master intercommunications switch decks for each of said teaching lesson playback means and an additional one of said master intercommunications switch decks for relay power control switching, said master intercommunications switch decks having a talk and listen stations with a sound and return line terminals for each of said teaching lesson playback means at said listen station and master microphone terminals at said talk station; electric circuit means coupling said sound line of each of said teaching lesson playback means to the respective listen station sound line terminal on the corresponding deck of the master intercommunications switch; electric circuit means coupling the return line of each of said teaching lesson playback means to the respective listen station return line terminal on the corresponding deck of the master intercommunications switch; a master microphone at the control console; electric circuit means coupling said master microphone to said master microphone terminals at the talk station of said master intercommunications switch; electric circuit means coupling each of said teaching lesson playback decks of said master intercommunications switch to a corresponding station on the sound and return line decks of said multistation master lesson selector switches and said plurality of student selector gang switches; an individual talk-listen switch for each of said student positions adjacent each corresponding multistation student selector switch on said control console; a master earphone at said control console, each of said individual talk-listen switches having a talk, a listen and a neutral positions; electric circuit means coupling said master earphone to the talk and listen positions of each of said individual talk-listen switches; electric circuit means coupling said master microphone to said talk position of each of said individual talk-listen switches; electric circuit means coupling said sound and return line decks of each of said respective student selector switches to said neutral position of the corresponding individual talk-listen switch; electric circuit means coupling said neutral position of each individual talk-listen switch to said student earphone-microphone circuit coupling; means of the corresponding student position; electric circuit means coupling the talk and listen positions of each individual talk-listen switch to said student earphone-microphone circuit coupling means in the corresponding student position; means at each of said individual talk-listen switches for selecting between said neutral position, said listen position combined with said neutral position, and said talk position whereby to selectively couple respectively said sound and return lines to the earphone in the corresponding student position, said master earphone to said corresponding student position earphone, and said master microphone and master earphone to the earphone of said corresponding student position in place of said sound and return lines; low voltage electric circuit relay means for each student position coupled in responsive relation to said talk position of said corresponding student position talk-listen switch and to said sound and return lines of said corresponding remotely located record and playback equipment and said corresponding student microphone-earphone circuit coupling means for causing the recording of substantially all sound reaching said corresponding student earphones; low voltage electric circuit relay means for each student position coupled in responsive relation to the listen position of said corresponding student talk-listen switch, said corresponding remotely located record and playback equipment and corresponding student microphone-earphone circuit coupling means for causing the playback to said corresponding students earphones of the recorded sound on said corresponding remotely located record and playback equipment and the simultaneous decoupling from said corresponding student position of said teaching lesson playback means; and means coupled in responsive relation to said talk station on said relay power control deck of said master intercommunications switch for decoupling said teaching lesson playback means from said plurality of student positions.

2. In an audio teaching aid system, the combination of a plurality of teaching lesson playback means; a plurality of record and playback equipments; a plurality of student positions remote from the teaching lesson playback means and the record and playback equipments with one of said student positions for each of the remotely located record and playback equipments, each of said student positions including a switch having a talk and listen positions; a control console in remote relation to said student positions, said control console including a plurality of multistation student selector switches, one of said student selector switches for each of said student positions, one of said stations on each of said plurality of student selector switches for each of said plurality of teaching lesson playback means; an additional one of said stations on each of said plurality of student selector switches being a master station; said control console also including a multistation master lesson selector switch with one of the master lesson selector switch stations for each of said plurality of teaching lesson playback means; said control console additionally including a master intercommunications switch having a talk and listen stations for each of said teaching lesson playback means; means coupling each of said plurality of teaching lesson playback means to the corresponding listen station of said master intercommunications switch; means coupling each of said corresponding listen stations of said master intercommunications switch to a corresponding station on each of said multistation student selector switches and said multistation master lesson selector switch; a teacher microphone at said control console; means coupling said teacher microphone to said talk station of said master intercommunications switch; means at said master intercommunications switch for selecting between said talk and listen stations of said master intercommunications switch and thereby selectively and alternatively coupling said plurality of teaching lesson playback means and said teacher microphone to said corresponding stations of said multistation master lesson selector switch and said corresponding stations of each of said plurality of multistation student selector switches; means coupled in responsive relation to the talk position of each of said student position talk-listen switches for coupling the respective remotely located multistation student selector switch and record portion of the respective remotely located record and playback equipment to the corresponding student position whereby when said master intercommunications switch station selecting means is at said master intercommunications listen station then said corresponding multistation student selector switch has capacity to selectively couple any one of said plurality of remotely located teaching lesson playback means to the corresponding student position for lesson reception at said corresponding student position and simultaneous recording of said received lesson on said record portion of the corresponding remotely located record and playback equipment, and when said master intercommunications switch station selecting means is at said master intercommunications talk station then said teacher microphone is coupled to said multistation master and student selector switches and thereby to the student positions for reception and simultaneous recording of the teacher microphone communication; means coupling said master station of each of said student selector switches to said multistation master lesson selector switch whereby the master lesson selector switch has capacity at the control console to couple any one of said plurality of teaching lesson playback means simultaneously to all of said remotely located student positions whose corresponding multistation student selector switch has been positioned to said student selector switch's master station; and means coupled in responsive relation to said listen position of each respective student position talk-listen switch for simultaneously coupling the playback portion of the corresponding remotely located record and playback equipment to said corresponding student position and decoupling said teaching lesson playback means from said corresponding student position.

3. In an audio teaching aid system, the combination of a plurality of teaching lesson playback means; a plurality of record and playback equipments; a plurality of student positions remote from the teaching lesson playback means and the record and playback equipments with one of said student positions for each of the remotely located record and playback equipments, each of said student positions including a switch having a talk and listen positions; a control console in remote relation to said student positions, said control console including a plurality of multistation student selector switches, one of said student selector switches for each of said student positions, one of said stations on each of said plurality of student selector switches for each of said plurality of teaching lesson playback means; an additional one of said stations on each of said plurality of student selector switches being a master station; said control console also including a multistation master lesson selector switch with one of the master lesson selector switch stations for each of said plurality of teaching lesson playback means; means coupling each of said plurality of teaching lesson playback means to the corresponding station of said master lesson selector switch and the corresponding station of each of said plurality of student selector switches; means coupled in responsive relation to the talk position of each of said student position talk-listen switches for coupling the respective remotely located student selector switch and record portion of the respective remotely located record and playback equipment to the corresponding student position whereby said corresponding student selector switch has capacity to selectively couple any one of said plurality of remotely located teaching lesson playback means to the corresponding student position for simultaneous lesson reception at the corresponding student position and recording on said record portion of the corresponding remotely located record and playback equipment; means coupling said master station of each of said student selector switches to said multistation master lesson selector switch whereby the master lesson selector switch has capacity at the control console to couple any one of said plurality of teaching lesson playback means simultaneously to all of said remotely located student positions whose corresponding multistation student selector switch has been positioned to said student selector switch's master station; and means coupled in responsive relation to said listen position of each respective student position talk-listen switch for simultaneously coupling the playback portion of the corresponding remotely located record and playback equipment to said corresponding student position and simultaneously decoupling said teaching lesson playback means from said corresponding student position.

4. In an audio teaching aid system, the combination of a plurality of teaching lesson playback means; a plurality of record and playback equipments; a plurality of student positions remote from the teaching lesson playback means and the record and playback equipments with one of said student positions for each of the remotely located record and playback equipments, each of said student positions including a switch having a talk and listen positions; a control console in remote relation to said student positions, said control console including a plurality of multistation student selector switches, one of said student selector switches for each of said student positions and one of said stations on each of said plurality of student selector switches for each of said plurality of teaching lesson playback means; means coupling each of said plurality of teaching lesson playback means to the corresponding station of each of said multistation student selector switches; means coupled in responsive relation to the talk position of each of said student position talk-listen switches for coupling the respective remotely located student selector switch and record portion of the respective remotely located record and playback equipment to the corresponding student position whereby said corresponding student selector switch has capacity to selectively couple any one of said plurality of remotely located teaching lesson playback means to the corresponding student position for simultaneous lesson reception at the corresponding student position and recording on the record portion of the corresponding remotely located record and playback equipment; and means coupled in responsive relation to the listen position of each respective student position talk-listen switch for coupling the playback portion of the corresponding remotely located record and playback equipment to said corresponding student position and simultaneously decoupling said teaching lesson playback means from said corresponding student position.

5. In an audio teaching aid system, the combination of a plurality of student positions, each of the student positions including earphones, and a microphone; record and playback equipment grouped together in remote relation to said student positions, the record and playback equipment including a tape recorder and playback unit for each of the student positions coupled to the earphones and microphone of the respective student position and a plurality of audio teaching lesson means; a switch at each student position for selectively coupling the record and playback of the corresponding remotely-located record and playback unit; a master position in remote relation to both the student positions and record and playback equipment, the master position including master earphones, a master microphone, and a control console, the control console including a student selector switch for each student position coupled to the respective student position and having selective coupling means to each of said plurality of audio teaching means, an individual talk-listen switch for each of the student positions coupled to the master earphones, master microphone and the respective student position for communication therebetween and means in responsive relation to each individual talk-listen switch for automatically decoupling the corresponding student selector switch when the associated talk-listen switch is in the talk position.

6. In an audio teaching aid system, the combination of a plurality of student positions; playback equipments grouped together in remote relation to said student positions; and a control console remote to both the student positions and playback equipments; a plurality of switching means in the control console including a student selector switch for each of the student positions and a master selector switch, each of said student selector switches and said master selector switch having a plurality of selector terminals one selector terminal of each switch coupled to a corresponding playback equipment and one of the selector terminals on each student selector switch coupled to the master selector switch thereby providing in each student selector switch a capacity for selectively coupling each individual student position to a selected playback equipment and alternatively to the master selector switch.

7. In an audio teaching aid system, the combination of a plurality of student positions, teaching lesson playback means and recording and playback equipments grouped together in remote relation to said student positions, one of said recording and playback equipments coupled to each of the student positions, a teaching control position remote to both the student positions, teaching lesson playback means and recording and playback equipments, and including an audio receiver, microphone, and control console containing a plurality of switching means, the switching means including a student selector switch for each of the student positions, a master selector switch, and a master intercommunications switch, the student and master selector switches having a plurality of selector terminals with selected ones of said terminals coupled to corresponding lesson playback unit of the teaching lesson playback means and one of the selector terminals on each of the student selector switches coupled to the master selector switch for thereby providing capacity for selectively coupling each student position through its corresponding student selector switch to selected lesson playback units and alternatively through said one student selector terminal of the corresponding student selector switch and a selected one of said plurality of said master selector switch terminals to a selected lesson playback unit, the master intercommunications switch being interposed in the selector switch coupling to said teaching lesson playback means and microphone for selecting between the coupling of said microphone and lesson playback units to the student positions.

8. In an audio teaching aid system, the combination of a plurality of tape record and playback equipments grouped together, a student position with earphone and microphone for each of the record and playback equipments positioned in remote relation to the equipments; record and playback switching means for each of the student positions coupled to the respective earphone and microphone and record and playback equipment; a plurality of audio lesson playback means; a teaching control position in remote relation to said audio lesson playback teaching means and student positions and including selector switching means coupled to said audio teaching means and student positions for coupling the earphones of the selected student positions to a selected audio teaching means; and automatic stop means for each of the record and playback means, each automatic stop means including an electrically conductive element coupled to the tape of the associated record and playback means at a selected start position on the tape, and a relay circuit stop means for the associated record and playback means with relay circuit terminals in a position at said tape to be electrically engaged by said element during movement with said tape past said terminals to activate said relay circuit stop means and thereby automatically stopping operation of said record and playback means at said selected start position.

References Cited by the Examiner

UNITED STATES PATENTS

| | | | |
|---|---|---|---|
| 2,353,070 | 7/1944 | Pitkin | 179—156 |
| 2,874,219 | 2/1959 | Cavanaugh | 179—100.1 |
| 2,876,561 | 3/1959 | Horne | 35—35.3 |
| 2,908,767 | 10/1959 | Fritzinger | 179—100.2 |

OTHER REFERENCES

Health, "A Language Laboratory Handbook for 1956," pages 25 and 26 relied on.

Language Laboratory Systems Installation Manual, publication of Radio Corp. of America (IB 33297), June 1959, page 27 relied on.

EUGENE R. CAPOZIO, *Primary Examiner.*

LAWRENCE CHARLES, *Examiner.*

WILLIAM GRIEB, *Assistant Examiner.*